Nov. 7, 1939.　　　　M. V. GROVES　　　　2,179,241
COMPOUND HYDRAULIC BRAKE PUMP
Filed Nov. 26, 1938　　　2 Sheets-Sheet 1
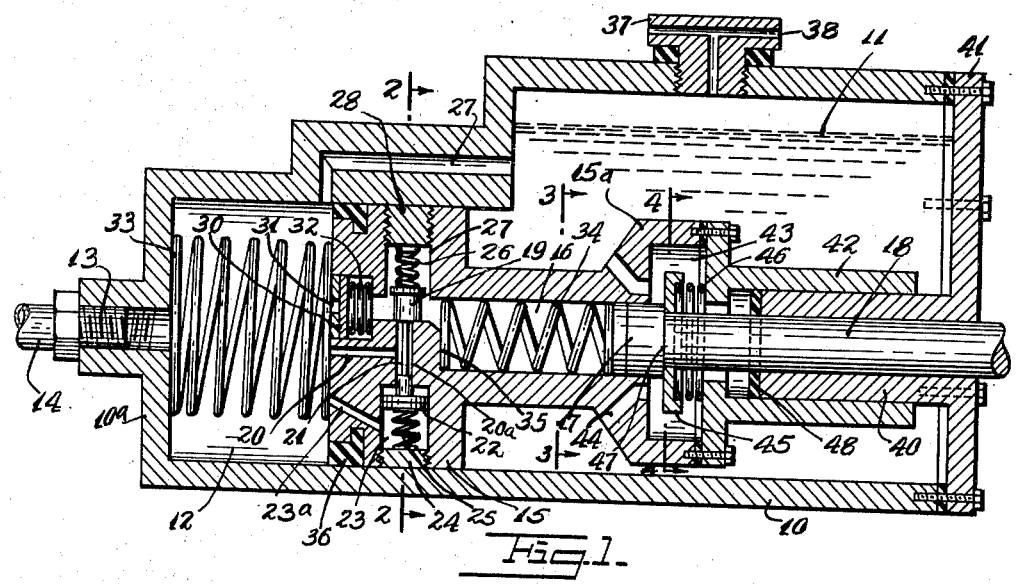
INVENTOR
*Martin V. Groves*
BY
ATTORNEY Patented Nov. 7, 1939

2,179,241

UNITED STATES PATENT OFFICE 2,179,241

COMPOUND HYDRAULIC BRAKE PUMP

Martin V. Groves, New York, N. Y., assignor of one-half to Airdraulic Brake Corporation, Bellerose, N. Y.

Application November 26, 1938, Serial No. 242,474

10 Claims. (Cl. 60—54.6)

This invention relates to new and useful improvements in a compound hydraulic brake pump.

The invention has for an object the construction of a pump as mentioned which is characterized by a main piston working in a cylinder and capable of displacing a relatively large amount of hydraulic fluid, and an auxiliary small piston associated with said main piston and adapted to produce a relatively high pressure at the end of the stroke of the main piston.

More specifically, the invention relates to specific hydraulic fluid means for normally rigidly connecting the said pistons together as a unit and controlled with a pressure loaded valve actuated by the pressure of the hydraulic fluid in the front end of the cylinder and controlling a passage extending from a bore in which the auxiliary piston works into the front end of said main piston for connecting the fluid in the bore with the front of the main piston to disconnect the pistons.

Still further the invention proposes the provision of a one way valve controlling a passage through which fluid from the front of said cylinder may enter said bore upon rearward motion of the auxiliary piston.

Furthermore, the invention contemplates the provision of means for holding said main piston against rearward motion while said auxiliary piston is in a forward position relative to the main piston.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure—

Fig. 1 is a vertical longitudinal sectional view of a compound hydraulic brake pump constructed according to this invention.

Fig. 2 is a transverse vertical sectional view on the line 2—2 of Fig. 1.

Fig. 3 is a fragmentary transverse vertical sectional view on the line 3—3 of Fig. 1.

Fig. 4 is a fragmentary transverse vertical sectional view on the line 4—4 of Fig. 1.

Figure 5:
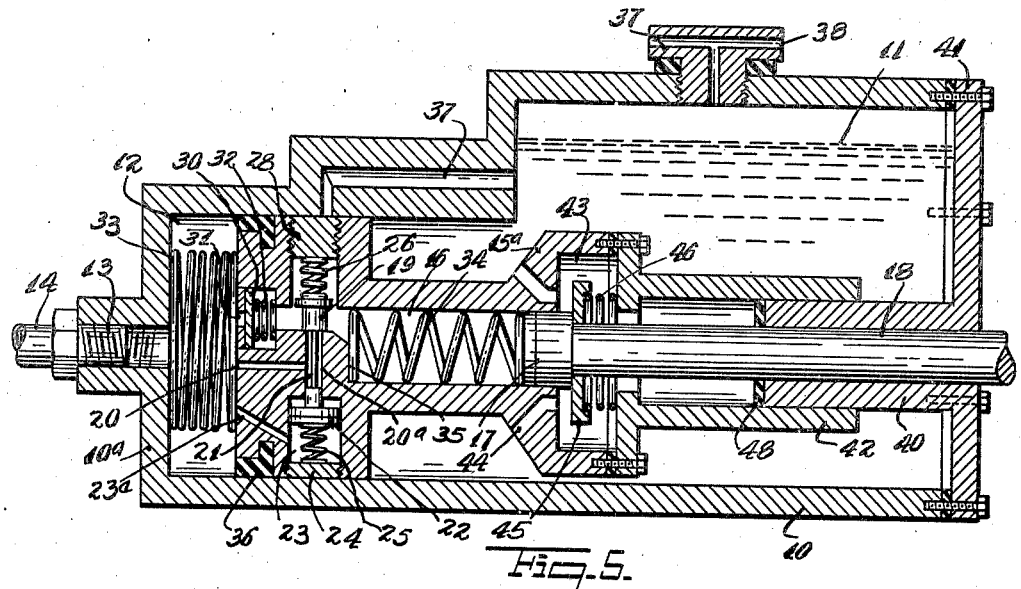
Fig. 5 is a vertical sectional view similar to Fig. 1 but illustrating the parts with the main and auxiliary pistons moved forward as a unit.

The compound hydraulic brake pump, according to this invention, includes a hollow body 10 for holding a hydraulic fluid 11 and having a cylinder 12 with a closed end 10ª, which end is provided with an opening 13 connected with a pipe line 14 for connection with the fluid line of hydraulic brakes. A main piston 15 is slidably mounted in the cylinder 12 and is formed with a small bore 16 in its rear end. An auxiliary small piston 17 is slidably mounted in the bore 16.

A means is provided for urging the small piston 17 forwards for applying the brakes and this means includes a piston rod 18 connected with the rear of the piston 17 and extending out from the rear end of the body 10 and adapted to be connected with a foot pedal or linkage or other mechanism by which the piston rod 18 may be manually moved forwards and rearwards. A hydraulic fluid means is provided for normally connecting said pistons 15 and 17 together as a unit and this means is controlled with a pressure loaded valve 19 actuated by pressure of the hydraulic fluid in the front end of the cylinder 12 and controlling a passage 20 extending from said bore 16 to the front end of the main piston 15 for connecting the fluid in the bore 16 with the fluid to the front of the main piston 15 to disconnect the pistons. The passage 20 has a branch portion 20ª through which a stem 21 of the valve 19 passes. This stem 21 is of a smaller diameter than the branch 20ª so as not to restrict the passage.

At the lower end the stem 20 connects with a small piston 22 working in a small bore 23 formed radially of the piston 40. A plug 24 closes the outer end of the bore 23. An expansion spring 25 is located within the bore 23 and acts between the plug 24 and the piston 22 for normally urging the piston 22 upwards. This upward motion is countered by a stronger expansion spring 26 mounted within a bore 27 formed radially of the piston 15. A plug 28 closes the outer end of the bore 27. The spring 26 acts between the plug 28 and the valve 19 for normally seating the valve upon the top end of the branch passage 20ª to close the passage. When the valve 19 is closed hydraulic fluid will be trapped in the bore 16 so that when the piston rod 18 is moved forwards the piston 15 will move with it as a unit.

A one way valve 30 is provided for controlling a passage 31 through which fluid from the front of the cylinder 12 may enter said bore 16 upon rearward motion of the auxiliary piston 17. This valve 30 is urged into a closed position by an expansion spring 32.

A means is provided for normally urging the main piston 15 rearwards. This means comprises an expansion spring 33 housed within the cylinder 12 and acting between the end wall 10ᵃ and the end of the main piston 15. Another means is provided for normally urging the auxiliary piston 17 rearwards and this means includes an expansion spring 34 housed within the bore 16 and acting between the auxiliary piston 17 and a shoulder or element 35 provided within the bore 16. The piston 15 is provided with a packing ring 36 to prevent leakage of hydraulic fluid around the edges thereof. A bleed passage 37 extends through the material of the body 10 and connects the main supply of hydraulic fluid 11 to the cylinder 12 while the piston 15 is in its rearward position. As soon as the piston 15 is moved even slightly forwards it will engage over the end of the passage 37 to entrap the hydraulic fluid in the cylinder 12. Thus the hydraulic fluid in the cylinder 12 will be continually replenished making up for any leakage which may occur in the lines of the hydraulic brake.

A plug 37 is engaged in an opening formed in the top of the body 10 and is turnable to permit the addition of hydraulic fluid to the body 10 when required. This plug 37 has a small bleed opening 38 through which air may pass to vent the body 10. This permits the free flow of the hydraulic fluid 11 within the body 10 as required.

A means is provided for holding the main piston 15 against rearward motion while said auxiliary piston 17 is in a forward position relative to the main piston 15. This means includes a stationary cylindrical member 40 coaxial with the piston rod 18 and mounted upon an end plate 41 which is secured upon the rear end of the body 10. This cylindrical member 40 engages into a hollow cylindrical portion 42 on the rear of the main piston 15. The rear end of the main piston 15 is provided with an enlarged portion 15ᵃ. Within this enlarged portion there is a chamber 43. A plurality of passages 44 extend from the outside of the portion 15ᵃ to the chamber 43. The inner ends of these passages 44 may be closed by a valve 45. This valve is slidably mounted on the piston rod 18. It is urged into a closed position by an expansion spring 46. It is held in an open position by a shoulder or element 47 formed on the piston rod 18 and normally engaging the side of the valve 45. Packing material 48 encircles the piston rod 18 and prevents the leakage of hydraulic fluid around the piston rod to the exterior of the body 10.

The operation of the device is as follows:
With the parts as illustrated in Fig. 1 the brake is "off". To apply the brake the piston rod 18 is moved forwards. Since there is hydraulic fluid entrapped in the bore 16 which binds the main piston 15 together with the auxiliary piston 17 as a unit, the main piston 15 will move forward an amount identical to the movement of the piston rod 18. Because of the relative large diameter of the main piston 15 moving forwards in the cylinder 12, a relatively large amount of hydraulic fluid within the cylinder 12 will be displaced through the opening 13 and the pipe line 14 to fill up the hydraulic line to the brakes and move the brake shoes against the brake drum. When this position is reached the parts will be in the condition shown in Fig. 5. Further forward pressure of the piston rod 18 will cause an increase in the pressure of the hydraulic fluid within the cylinder 12.

Figure 6:
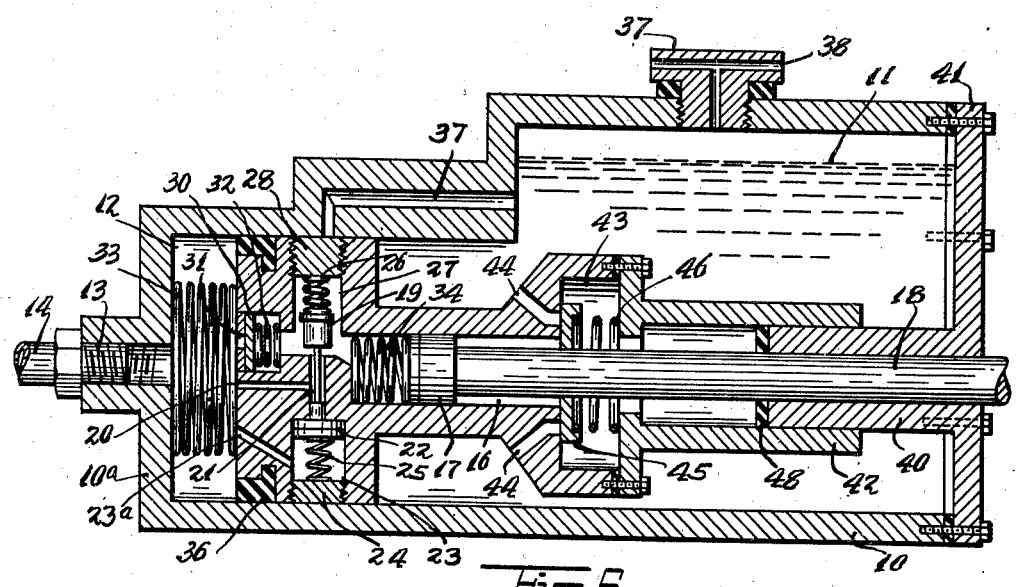
Fig. 6 is another sectional view similar to Fig. 5 but illustrating the auxiliary piston moved forward relative to the main piston.

An increase in the pressure in the cylinder 12 will be transmitted to open the valve 19. The pressure will be communicated through a small passage 23ᵃ extending from the front of the main piston 15 to the bore 23. If the pressure rises in the bore 23 the holding action of the spring 26 will be overcome and the valve 19 will lift. Instantly the piston 17 will start moving forward in the bore 16. This causes the shoulder or element 47 to disengage from the valve 45 which immediately closes, as illustrated in Fig. 6. Further forward motion of the piston 17 will force out hydraulic fluid from the bore 16 through the passage 20 to the front of the cylinder 12. Because of the relatively small diameter of the auxiliary piston 17 the hydraulic pressure in the cylinder 12 will be materially increased even though the force which moves forward the piston rod 18 remains constant. Thus there is now a hydraulic mechanical advantage present. The increased hydraulic pressure will serve to apply the hydraulic brakes with relatively great force. Soon the parts reach the position shown in Fig. 6 and now the hydraulic brake is fully applied.

It should be noted that the increasing pressure in the cylinder 12 will be arrested from moving the main piston 15 rearwards because the closing of the valve 45 locks the main piston 15 in a fixed position. When the valve 45 closes a certain amount of hydraulic fluid will be entrapped in the compartment 43, and since this fluid is incompressible the piston 15 will be positively held against rearward motion.

The brake is released in the following manner: The piston rod 18 is moved rearwards. Hydraulic fluid will be immediately sucked into the bore 16 because the one way valve 30 now opens. As the pressure falls in front of the piston 15 the valve 19 will be moved back by the spring 26 into its closed position. When the piston 17 reaches the valve 45 it will open this valve which opens the passages 44. Hydraulic fluid may now move from the chamber 43. Consequently, further rearward motion of the piston rod 18 will serve to move the main piston 15 rearwards simultaneous with the auxiliary piston 17. These parts are now connected as a unit and move together. Soon the parts will reach the original positions shown in Fig. 1. The brake is now "off".

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A compound hydraulic brake pump, comprising a body for holding a hydraulic fluid and having a cylinder with a closed front end and which is provided with an opening for connection with the fluid line of hydraulic brakes, a main piston slidably mounted in said cylinder and having a small bore in its rear end, an auxiliary small piston slidably mounted in said bore, means for urging said small piston forwards for applying the brakes, hydraulic fluid means for normally rigidly connecting said pistons together as a unit and controlled with a pressure loaded valve actuated by pressure of the hydraulic fluid in the front end of said cylinder and controlling a passage extending from said bore to the front end of said main piston for connecting the fluid in the bore with the fluid at the front of the main piston to disconnect the pistons, a one way valve controlling a passage through which fluid from the front of said cylinder may enter said bore upon rearward motion of said auxiliary piston, means for normally urging said main piston rearwards, means for normally urging said auxiliary piston rearwards, and means for holding said main piston against rearward motion while said auxiliary piston is in a forward position relative to said main piston.

2. A compound hydraulic brake pump, comprising a body for holding a hydraulic fluid and having a cylinder with a closed front end and which is provided with an opening for connection with the fluid line of hydraulic brakes, a main piston slidably mounted in said cylinder and having a small bore in its rear end, an auxiliary small piston slidably mounted in said bore, means for urging said small piston forwards for applying the brakes, hydraulic fluid means for normally rigidly connecting said pistons together as a unit and controlled with a pressure loaded valve actuated by pressure of the hydraulic fluid in the front end of said cylinder and controlling a passage extending from said bore to the front end of said main piston for connecting the fluid in the bore with the fluid at the front of the main piston to disconnect the pistons, a one way valve controlling a passage through which fluid from the front of said cylinder may enter said bore upon rearward motion of said auxiliary piston, means for normally urging said main piston rearwards, means for normally urging said auxiliary piston rearwards, and means for holding said main piston against rearward motion while said auxiliary piston is in a forward position relative to said main piston, and a bypass in said body terminating at the side wall of said cylinder at a point immediately to the front of the main position when the same is in its fully rear position.

3. A compound hydraulic brake pump, comprising a body for holding a hydraulic fluid and having a cylinder with a closed front end and which is provided with an opening for connection with the fluid line of hydraulic brakes, a main piston slidably mounted in said cylinder and having a small bore in its rear end, an auxiliary small piston slidably mounted in said bore, means for urging said small piston forwards for applying the brakes, hydraulic fluid means for normally rigidly connecting said pistons together as a unit and controlled with a pressure loaded valve actuated by pressure of the hydraulic fluid in the front end of said cylinder and controlling a passage extending from said bore to the front end of said main piston for connecting the fluid in the bore with the fluid at the front of the main piston to disconnect the pistons, a one way valve controlling a passage through which fluid from the front of said cylinder may enter said bore upon rearward motion of said auxiliary piston, means for normally urging said main piston rearwards, means for normally urging said auxiliary piston rearwards, and means for holding said main piston against rearward motion while said auxiliary piston is in a forward position relative to said main piston, said pressure loaded valve comprising a valve head engageable on a valve seat and connected with a valve stem, and a spring for urging the valve into a closed position.

4. A compound hydraulic brake pump, comprising a body for holding a hydraulic fluid and having a cylinder with a closed front end and which is provided with an opening for connection with the fluid line of hydraulic brakes, a main piston slidably mounted in said cylinder and having a small bore in its rear end, an auxiliary small piston slidably mounted in said bore, means for urging said small piston forwards for applying the brakes, hydraulic fluid means for normally rigidly connecting said pistons together as a unit and controlled with a pressure loaded valve actuated by pressure of the hydraulic fluid in the front end of said cylinder and controlling a passage extending from said bore to the front end of said main piston for connecting the fluid in the bore with the fluid at the front of the main piston to disconnect the pistons, a one way valve controlling a passage through which fluid from the front of said cylinder may enter said bore upon rearward motion of said auxiliary piston, means for normally urging said main piston rearwards, means for normally urging said auxiliary piston rearwards, and means for holding said main piston against rearward motion while said auxiliary piston is in a forward position relative to said main piston, said pressure loaded valve comprising a valve head engageable on a valve seat and connected with a valve stem, and a spring for urging the valve into a closed position, said valve stem connecting with a small bore in a smaller bore, and a bleed extending from said small bore to the front of said main cylinder.

5. A compound hydraulic brake pump, comprising a body for holding a hydraulic fluid and having a cylinder with a closed front end and which is provided with an opening for connection with the fluid line of hydraulic brakes, a main piston slidably mounted in said cylinder and having a small bore in its rear end, an auxiliary small piston slidably mounted in said bore, means for urging said small piston forwards for applying the brakes, hydraulic fluid means for normally rigidly connecting said pistons together as a unit and controlled with a pressure loaded valve actuated by pressure of the hydraulic fluid in the front end of said cylinder and controlling a passage extending from said bore to the front end of said main piston for connecting the fluid in the bore with the fluid at the front of the main piston to disconnect the pistons, a one way valve controlling a passage through which fluid from the front of said cylinder may enter said bore upon rearward motion of said auxiliary piston, means for normally urging said main piston rearwards, means for normally urging said auxiliary piston rearwards, and means for holding said main piston against rearward motion while said auxiliary piston is in a forward position relative to said main piston, said one way valve being disposed within a bore formed in the end of said main cylinder, and a spring for urging the valve closed.

6. A compound hydraulic brake pump, comprising a body for holding a hydraulic fluid and having a cylinder with a closed front end and which is provided with an opening for connection with the fluid line of hydraulic brakes, a main piston slidably mounted in said cylinder and having a small bore in its rear end, an auxiliary small piston slidably mounted in said bore, means for urging said small piston forwards for applying the brakes, hydraulic fluid means for normally rigidly connecting said pistons together as a unit and controlled with a pressure loaded valve actuated by pressure of the hydraulic fluid in the front end of said cylinder and controlling a passage extending from said bore to the front end of said main piston for connecting the fluid in the bore with the fluid at the front of the main piston to disconnect the pistons, a one way valve controlling a passage through which fluid from the front of said cylinder may enter said bore upon rearward motion of said auxiliary piston, means for normally urging said main piston rearwards, means for normally urging said auxiliary piston rearwards, and means for holding said main piston against rearward motion while said auxiliary piston is in a forward position relative to said piston, comprising a stationary cylindrical member engaging into a hollow cylindrical portion in the rear of said main piston entrapping hydraulic fluid, a normally closed valve controlling a passage connecting said hollow cylindrical portion with the fluid in said body, and an element connected with said auxiliary piston and in the rear position of the auxiliary piston engaging said latter valve for opening same to release the entrapped fluid.

7. A compound hydraulic brake pump, comprising a body for holding a hydraulic fluid and having a cylinder with a closed front end and which is provided with an opening for connection with the fluid line of hydraulic brakes, a main piston slidably mounted in said cylinder and having a small bore in its rear end, an auxiliary small piston slidably mounted in said bore, means for urging said small piston forwards for applying the brakes, hydraulic fluid means for normally rigidly connecting said pistons together as a unit and controlled with a pressure loaded valve actuated by pressure of the hydraulic fluid in the front end of said cylinder and controlling a passage extending from said bore to the front end of said main piston for connecting the fluid in the bore with the fluid at the front of the main piston to disconnect the pistons, a one way valve controlling a passage through which fluid from the front of said cylinder may enter said bore upon rearward motion of said auxiliary piston, means for normally urging said main piston rearwards, means for normally urging said auxiliary piston rearwards, and means for holding said main piston against rearward motion while said auxiliary piston is in a forward position relative to said main piston, comprising a stationary cylindrical member engaging into a hollow cylindrical portion in the rear of said main piston entrapping hydraulic fluid, a normally closed valve controlling a passage connecting said hollow cylindrical portion with the fluid in said body, and an element connected with said auxiliary piston and in the rear position of the auxiliary piston engaging said latter valve for opening same to release the entrapped fluid, said hollow cylindrical portion being formed with a chamber, said latter-mentioned valve being disposed in said chamber, and said latter-mentioned valve being engageable over said passage.

8. A compound hydraulic brake pump, comprising a body for holding a hydraulic fluid and having a cylinder with a closed front end and which is provided with an opening for connection with the fluid line of hydraulic brakes, a main piston slidably mounted in said cylinder and having a small bore in its rear end, an auxiliary small piston slidably mounted in said bore, means for urging said small piston forwards for applying the brakes, hydraulic fluid means for normally rigidly connecting said pistons together as a unit and controlled with a pressure loaded valve actuated by pressure of the hydraulic fluid in the front end of said cylinder and controlling a passage extending from said bore to the front end of said main piston for connecting the fluid in the bore with the fluid at the front of the main piston to disconnect the pistons, a one way valve controlling a passage through which fluid from the front of said cylinder may enter said bore upon rearward motion of said auxiliary piston, means for normally urging said main piston rearwards, means for normally urging said auxiliary piston rearwards, and means for holding said main piston against rearward motion while said auxiliary piston is in a forward position relative to said main piston, comprising a stationary cylindrical member engaging into a hollow cylindrical portion in the rear of said main piston entrapping hydraulic fluid, a normally closed valve controlling a passage connecting said hollow cylindrical portion with the fluid in said body, and an element connected with said auxiliary piston and in the rear position of the auxiliary piston engaging said latter valve for opening same to release the entrapped fluid, said hollow cylindrical portion being formed with a chamber, said latter-mentioned valve being disposed in said chamber, and said latter-mentioned valve being engageable over said passage, and a spring tending to urge said valve into a closed position.

9. A compound hydraulic brake pump, comprising a body for holding a hydraulic fluid and having a cylinder with a closed front end and which is provided with an opening for connection with the fluid line of hydraulic brakes, a main piston slidably mounted in said cylinder and having a small bore in its rear end, an auxiliary small piston slidably mounted in said bore, means for urging said small piston forwards for applying the brakes, hydraulic fluids means for normally rigidly connecting said pistons together as a unit and controlled with a pressure loaded valve actuated by pressure of the hydraulic fluid in the front end of said cylinder and controlling a passage extending from said bore to the front end of said main piston for connecting the fluid in the bore with the fluid at the front of the main piston to disconnect the pistons, a one way valve controlling a passage through which fluid from the front of said cylinder may enter said bore upon rearward motion of said auxiliary piston, means for normally urging said main piston rearwards, means for normally urging said auxiliary piston rearwards, and means for holding said main piston against rearward motion while said auxiliary piston is in a forward position relative to said main piston, comprising a stationary cylindrical member engaging into a hollow cylindrical portion in the rear of said main piston entrapping hydraulic fluid, a normally closed valve controlling a passage connecting said hollow cylindrical portion with the fluid in said body, and an element connected with said auxiliary piston and in the rear position of the auxiliary piston engaging said latter valve for opening same to release the entrapped fluid, said hollow cylindrical portion being formed with a chamber, said latter-mentioned valve being disposed in said chamber, and said latter-mentioned valve being engageable over said passage, and a spring tending to urge said valve into a closed position, said element comprising a shoulder on a piston rod for said auxiliary piston.

10. A compound hydraulic brake pump, comprising a body for holding a hydraulic fluid and having a cylinder with a closed front end and which is provided with an opening for connection with the fluid line of hydraulic brakes, a main piston slidably mounted in said cylinder and having a small bore in its rear end, an auxiliary small piston slidably mounted in said bore, means for urging said small piston forwards for applying the brakes, hydraulic fluid means for normally rigidly connecting said pistons together as a unit and controlled with a pressure loaded valve actuated by pressure of the hydraulic fluid in the front end of said cylinder and controlling a passage extending from said bore to the front end of said main piston for connecting the fluid in the bore with the fluid at the front of the main piston to disconnect the pistons, a one way valve controlling a passage through which fluid from the front of said cylinder may enter said bore upon rearward motion of said auxiliary piston, means for normally urging said main piston rearwards, means for normally urging said auxiliary piston rearwards, and means for holding said main piston against rearward motion while said auxiliary piston is in a forward position relative to said main piston, comprising a stationary cylindrical member engaging into a hollow cylindrical portion in the rear of said main piston entrapping hydraulic fluid, a normally closed valve controlling a passage connecting said hollow cylindrical portion with the fluid in said body, and an element connected with said auxiliary piston and in the rear position of the auxiliary piston engaging said latter valve for opening same to release the entrapped fluid, said hollow cylindrical portion being formed with a chamber, said latter-mentioned valve being disposed in said chamber, and said latter-mentioned valve being engageable over said passage, and a spring tending to urge said valve into a closed position, said element comprising a shoulder on a piston rod for said auxiliary piston, said piston rod engaging through said stationary cylindrical member to the exterior of said body.

MARTIN V. GROVES.